Dec. 22, 1942.     H. OSWALD     2,306,277
INTERNAL COMBUSTION ENGINE AND SUPERCHARGING APPARATUS
Filed May 16, 1939
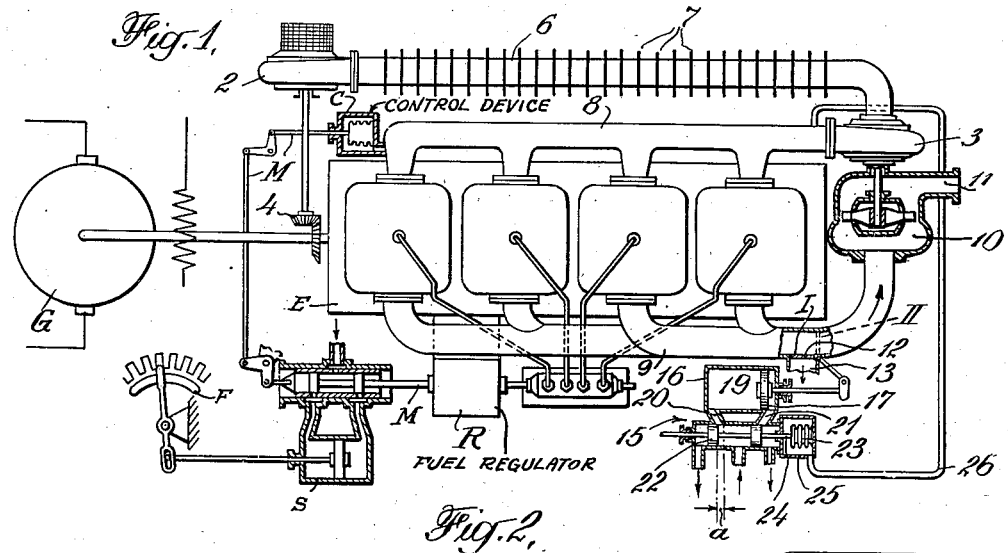
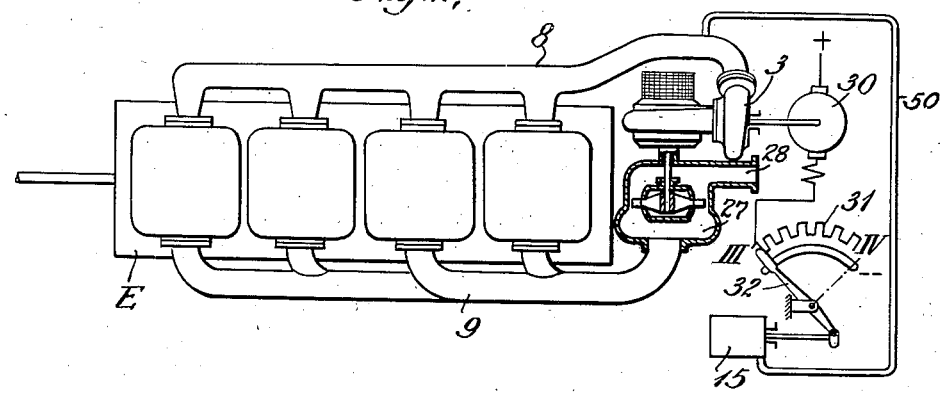
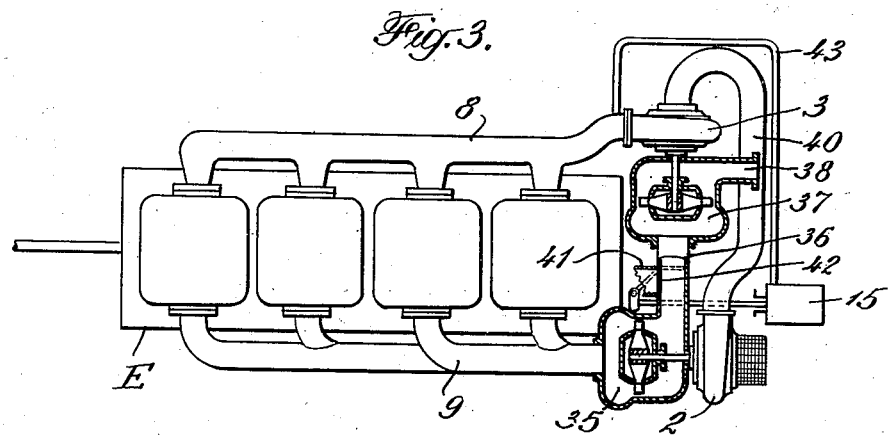
INVENTOR
*Hans Oswald*
BY
*Pennie, Davis, Marvin & Edmonds*
ATTORNEYS Patented Dec. 22, 1942

2,306,277

UNITED STATES PATENT OFFICE 2,306,277

INTERNAL COMBUSTION ENGINE AND SUPERCHARGING APPARATUS

Hans Oswald, Winterthur, Switzerland, assignor to Sulzer Frères, Société Anonyme, Winterthur, Switzerland Application May 16, 1939, Serial No. 273,922
In Switzerland June 22, 1938

2 Claims. (Cl. 60—13)

The invention relates to internal combustion engines having supercharging apparatus, and particularly to engines which are used under varying barometric pressures such as engines which are moved through wide ranges in altitude. The invention aims to provide an improved supercharging apparatus for maintaining automatically the supercharging pressure at predetermined pressures. The apparatus of the invention comprises at least two supercharging blowers, one of which is variably controlled by a regulating device, responsive to changes in the pressure of the supercharging air.

Many difficulties have been encountered heretofore in attempting to provide supercharging apparatus that will function economically on engines moved through wide ranges in altitude; in other words, engines which operate under fluctuating barometric pressures. It is desirable from a standpoint of engine performance that the supercharging pressure be at the same absolute value and the temperature constant, but this would require the compression ratio to change very greatly from high to low altitudes. In a single supercharging blower having a number of stages, this can be accomplished only in an incomplete way. Large changes in the compression ratio are possible economically only when the number of the compression stages is increased with increasing height above sea level. Even where multiple blowers are connected in series and work independently of one another, the number of the compression stages remains the same. The aim to utilize the internal combustion engine to the fullest extent possible in all altitudes is therefore not attained. When such blowers work at high barometric pressure, the compression ratio must be reduced artificially, that is to say, air must be let off. However, such compressors do not work economically.

The invention aims to avoid the aforementioned disadvantages. In the apparatus of the invention, one blower serves for supplying supercharged air under all conditions of altitude and barometric pressure (hereinafter referred to as the primary supercharging blower), while the other blower (hereinafter referred to as the secondary supercharging blower) serves only to supply additional supercharged air at higher altitudes. This makes it possible by simple means to adapt the compression ratio, with economical working of the blowers, to the initial pressure or to the pressure of the surrounding air.

The accompanying drawing illustrates more or less schematically apparatus embodying the invention, in which:

Fig. 1 is a plan view of one form of apparatus according to the invention;

Fig. 2 is a plan view of another form of apparatus according to the invention; and Fig. 3 is a plan view of a different form of apparatus according to the invention.

The apparatus illustrated in the drawing comprises an internal combustion engine E which may be connected to any suitable load such as a generator G shown in Fig. 1 together with the load-engine-control apparatus including a fuel regulator R responsive to engine speed, field excitation means F for regulating the load of the generator, a control device C responsive to the pressure of the supercharging air supplied to the engine, and a servo-motor S connected to the fuel regulator, the field excitation means and the control device by suitable coupling members M, whereby the load is regulated in accordance with the speed and the supercharging air pressure.

The engine is provided with supercharging apparatus comprising a directly driven primary blower 2 and a secondary blower 3 variably controlled in accordance with the pressure of the supercharged air.

In the apparatus of Fig. 1, the primary blower 2 is driven directly from the engine by a transmission gear 4. The primary blower 2 draws in the ambient air and discharges it into a conduit 6, preferably provided with cooling fins 7, which connects to the intake side of the secondary blower 3. The discharge side of the blower 3 connects to the air manifold 8 which is arranged to supply the various cylinders of the engine with the supercharging air in the usual way. The various cylinders of the engine exhaust into the exhaust manifold 9 connected to the exhaust turbine 10 which is coupled by drive means to the secondary blower 3. The exhaust turbine 10 drives the blower 3 and discharges its spent gases through the exhaust device 11. The exhaust manifold 9 is provided with a flap valve 12 arranged to pass all or a part of the gas to the turbine 10, or to pass all or a part of the gas to the atmosphere through the by-pass opening 13. The valve 12 is operated by a control device 15 having a servo-motor 16, the piston 17 of which is operatively connected to the valve 12. The servo-motor cylinder 19 has passages 20 and 21, a control piston or valve 22 and an expansible bellows 23 connected to the shaft 24 on which the valve 22 is mounted. The bellows 23 is inside a chamber 25 connected by conduit 26 to the air manifold 8. The supercharging pressure is imposed upon the bellows 23 and variations in pressure shift the valve 22.

In the position shown in the drawing the slide valve 22 has released the supply of pressure medium to the left side of the servo-motor cylinder 19, so that the piston 17 is in the right-hand end position and the valve 12 in the exhaust manifold 9 remains closed, that is, in the position I. When the supercharging air pressure increases, the valve 22 is moved toward the right. Only after having traversed the valve path a, does the valve reach its central position. If the pressure increases still further, the supply of pressure medium to the right side of the cylinder 19 will be opened and the piston 17 is moved toward the left, which opens the valve 12 permitting the exhaust gases to emerge through the by-pass outlet 13.

When the supercharging air pressure falls again, the valve 22 reaches the central position, in which the left as well as the right side of the cylinder 19 is shut off from the supply of pressure medium. In this position the piston 17 and the valve 12 take a definite position, which corresponds to the compression ratio necessary in order to attain the value of the supercharging air pressure that is to be maintained constant at a given pressure of the surrounding air. In this case the total compression ratio can be distributed to the two compressors in different ways. From a definite pressure of the ambient air onwards the supply of exhaust gases to the turbine 10 can be controlled by means of the valve 12. The turbine 10 may be supplied with a maximum quantity of exhaust gas, as when the valve 12 is in position I, or the turbine 10 may be shut off from exhaust gas as when the valve 12 is in the position II. In other words the exhaust turbine may be shut down, operated at a maximum or at variable speeds between those limits. The blower 2 continues to operate as long as the internal combustion engine runs. When the blower 3 is operating, it may be considered as a high stage blower.

In the apparatus of Fig. 2, the exhaust manifold 9 connects to the exhaust turbine 27 and the gases are discharged through the exhaust device 28. The turbine 27 drives the primary blower 2, the discharge side of which is connected by conduit to the intake side of the secondary blower 3 and the compressed air passes through blower 3, enters the air manifold 8 and passes into the engine. The blower 3 is driven by the electric motor 30 controlled by apparatus actuated by the pressure of the supercharged air comprising a resistance 31 for the regulation of the motor, a contact lever 32 operated by a control device 15 similar to the control device 15 of Fig. 1. The control device connects by conduit 50 to the manifold 8 and swings the lever 32 between the limits of positions III and IV due to variations in the pressure of the supercharging air.

As long as the internal combustion engine is in operation, the waste gases pass through the manifold 9 to the turbine 27 and from there into the exhaust 28 so that the blower 2 is constantly in operation. On the other hand, the blower 3 is independently driven by the electric motor 30. It is only temporarily in operation according to the initial pressure of the air, since the regulating device 15 cuts in stages of the resistance 31 when a definite value of the supercharging air pressure is exceeded. Thereby the output of the electric motor 30 and the output of the blower 3 are lowered.

In the position IV of the contact lever 32, the motor 30 is cut out and the blower 3 is stopped. In the position III of the contact lever 32, the motor 30 runs at highest speed. The supercharging air pressure will therefore be maintained constant temporarily in a certain range by the regulation of the speed of the motor 30. The regulation of the speed of the motor 30 can also be effected in any other suitable way, for example by a resistance connected in the shunt field circuit, or through tapping of the field of the motor 30.

In the form of apparatus illustrated in Fig. 3, the manifold 9 connects to a turbine 35 which is coupled to and drives the blower 2. Turbine 35 is connected by conduit 36 to the turbine 37 in such way that the exhaust of turbine 35 drives the turbine 37. The turbine 37 exhausts to the atmosphere through the opening 38. The turbine 37 is coupled to and drives the secondary blower 3. The outlet side of the primary or directly driven blower 2 is connected by conduit 40 to the intake side of blower 3, the outlet side of which connects to the air manifold 8. The conduit 36 has a by-pass opening 41 and a flap valve 42 arranged to discharge the exhaust from turbine 35 to the atmosphere or to permit all or a part thereof to pass to the turbine 37. The valve 42 is connected to a control device 15 which is connected by pipe 43 to the air manifold 8. The control device 15 and valve 42 are constructed and operated in substantially the same manner as the control device 15 and valve 12 of Fig. 1.

As shown in Fig. 3, the blower 2 and the blower 3 are driven by exhaust gas turbines 35 and 37 respectively which are connected in series. The regulating device 15 controls the outlet valve 42 in the conduit 36 between the turbine 35 and the turbine 37. At the lowest barometric pressure ordinarily encountered, the valve 42 shuts off the outlet 41. The exhaust gas turbine 37 then drives the blower 3 for maximum output. If the barometric pressure exceeds a definite value, which depends on the value of the supercharging air pressure that is to be maintained constant and also on the load, the output of the exhaust gas turbine 37 is regulated by means of the regulating device 15 to provide the supercharging air pressure desired. The regulating device may cause the valve 42 to open the by-pass 41 and completely shut off the admission of the exhaust gases to the turbine 37 stopping it and the blower 3. The secondary blower 3 may be variably operated between the limits described in connection with Fig. 1.

Ordinarily it is desirable to endeavour to obtain the same absolute supercharging pressure at all barometric pressures, when the highest available output is to be obtained with a certain engine. If a substantial part or the whole compression work for the charging air is produced with the aid of the energy contained in the exhaust gases, limits are set to the compression ratio attainable in a blower driven in this way, since the energy which is available in practice and which is contained in the exhaust gases is sufficient only up to a definite altitude or a definite lower limit of the barometric pressure to bring the total quantity of air to the desired supercharging pressure. If one of the blowers is driven electrically or is driven directly by the engine, then the amount of the supercharging pressure to be attained is limited to a lesser extent. But even then, in special cases, it is advisable to forego the production of the highest supercharging pressure in the greater altitudes, for example, when the ascents are not steep and the highest available output is not required.

In directly driven blowers, the compression ratio is dependent on the speed and at constant speed is approximately constant, so that it can be advantageous to select the compression ratio of the directly driven blower so that the blower can produce the desired supercharging pressure at the highest barometric pressure that may occur, and thereby the advantage results that only the second blower needs to be regulated and thus the total compression ratio adapts itself to the change of the barometric pressure.

What I claim is:

1. An internal combustion engine and supercharging apparatus which comprises a first turbine driven by exhaust gas from the engine, a primary supercharging blower driven by the first turbine, a second turbine connected by conduit to the exhaust side of the first turbine and driven by the exhaust gas therefrom, a secondary supercharging blower driven by the second turbine, an air manifold for delivering supercharging air to the engine cylinders, conduit connecting the primary and secondary blowers in series and the secondary blower to the air manifold, a control device connected to the air manifold actuated by the pressure of the supercharging air, and means actuated by the control device controlling the operation of the second turbine.

2. A supercharged internal combustion engine which comprises a primary supercharging blower, a first turbine driven by exhaust gas from the engine operatively connected to the primary supercharging blower, a secondary supercharging blower connected in series to the primary supercharging blower, a second turbine connected to and arranged to be driven by exhaust gas from the first turbine, said second turbine being operatively connected to the secondary supercharging blower, conduit means for passing supercharged air from the primary supercharging blower through the secondary supercharging blower and into the engine cylinders, a control device, a conduit for imposing the pressure of the supercharging air upon the control device, and means for controlling the operation of the second turbine connected to and under the control of the control device, whereby the pressure of the supercharging air acting upon the control device controls the supercharging air supplied to the engine.

HANS OSWALD.